(12) United States Patent
Lee (10) Patent No.: US 11,638,138 B2
(45) Date of Patent: *Apr. 25, 2023

(54) DEVICE-TO-DEVICE CONTENT PROVIDING METHOD

(71) Applicant: SK Telecom Co., Ltd., Seoul (KR)

(72) Inventor: Jongmin Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 301 days.

This patent is subject to a terminal disclaimer.

(21) Appl. No.: 15/459,762

(22) Filed: Mar. 15, 2017

(65) Prior Publication Data
US 2017/0201875 A1 Jul. 13, 2017

Related U.S. Application Data

(63) Continuation of application No. PCT/KR2015/008090, filed on Aug. 3, 2015.

(30) Foreign Application Priority Data

Oct. 21, 2014 (KR) .................. 10-2014-0142568

(51) Int. Cl.
*H04W 8/00* (2009.01)
*G06Q 50/10* (2012.01)
(Continued)

(52) U.S. Cl.
CPC ............ *H04W 8/005* (2013.01); *G06Q 10/10* (2013.01); *G06Q 50/10* (2013.01); *G06Q 50/30* (2013.01);
(Continued)

(58) Field of Classification Search
CPC ... H04W 8/005; H04W 76/14; H04W 76/023; H04L 67/107; H04L 67/1072;
(Continued)

(56) References Cited

U.S. PATENT DOCUMENTS 9,918,350 B2* 3/2018 Kim .................. H04W 76/14
9,955,409 B2* 4/2018 Baek .................. H04W 48/16
(Continued)

FOREIGN PATENT DOCUMENTS

CN     1578222 A     2/2005
CN   102821115 A    12/2012
(Continued)

OTHER PUBLICATIONS

Korean Office Action dated Nov. 12, 2015 corresponding to Korean Application No. KR 10-2014-0142568.
(Continued)

*Primary Examiner* — Mohammed S Chowdhury
(74) *Attorney, Agent, or Firm* — Hauptman Ham, LLP (57) ABSTRACT

The present disclosure relates to a device-to-device (D2D) content providing method, and relates to a method for enabling D2D content transmission through a link with a communication control server for supporting D2D content transmission. To this end, the D2D content providing method can comprise the steps of: generating, by a terminal, an adjacent terminal list by searching for at least one connectable adjacent terminal; transmitting, to a communication control server, the adjacent terminal list and a D2D communication request for content including information on an available communication interface by the terminal; receiving, from the communication control server, information on one or more content providing terminals, which can provide the content selected on the basis of the information on the communication interface among adjacent terminals included in the adjacent terminal list, by the terminal; and making a request, to the content providing terminal, and receiving the content by the terminal.

7 Claims, 7 Drawing Sheets

(51) Int. Cl.
  *H04N 21/4402* (2011.01)
  *G06Q 10/10* (2012.01)
  *G06Q 50/30* (2012.01)
  *H04W 76/14* (2018.01)
  *H04L 67/1061* (2022.01)

(52) U.S. Cl.
  CPC ..... *H04L 67/1072* (2013.01); *H04N 21/4402* (2013.01); *H04W 76/14* (2018.02)

(58) Field of Classification Search
  CPC ........ G06Q 10/10; G06Q 50/10; G06Q 50/30; H04N 21/4402; H04N 21/40
  USPC .......................................................... 370/254
  See application file for complete search history.

(56) References Cited

U.S. PATENT DOCUMENTS

| | | | | |
|---|---|---|---|---|
| 2006/0234684 A1* | 10/2006 | Shin | ...................... | H04L 65/607 455/414.1 |
| 2007/0028133 A1* | 2/2007 | Izutsu | ................... | H04L 67/104 714/4.11 |
| 2011/0099372 A1* | 4/2011 | Annapureddy | ...... | H04N 21/632 713/168 |
| 2012/0166668 A1* | 6/2012 | Mathews | ............ | H04L 12/2812 709/231 |
| 2013/0268357 A1* | 10/2013 | Heath | ...................... | H04L 63/00 705/14.53 |
| 2014/0185529 A1* | 7/2014 | Lim | ...................... | H04W 8/005 370/328 |
| 2014/0206322 A1* | 7/2014 | Dimou | .................. | H04W 76/14 455/414.1 |
| 2014/0213180 A1* | 7/2014 | Cha | ....................... | H04W 4/008 455/41.1 |
| 2014/0244770 A1* | 8/2014 | Kim | ........................ | H04L 51/32 709/206 |
| 2014/0286284 A1* | 9/2014 | Lim | ........................ | H04L 5/003 370/329 |
| 2014/0321452 A1* | 10/2014 | Choi | ..................... | H04W 8/005 370/350 |
| 2014/0357269 A1* | 12/2014 | Zhou | ..................... | H04W 76/14 455/434 |
| 2016/0128123 A1* | 5/2016 | Li | ......................... | H04W 72/08 370/252 |
| 2017/0163470 A1* | 6/2017 | Seo | ........................ | H04W 76/14 |

FOREIGN PATENT DOCUMENTS

| | | |
|---|---|---|
| CN | 103891172 A | 6/2014 |
| CN | 104080170 A | 10/2014 |
| JP | 2012-510741 B2 | 5/2012 |
| JP | 2013-034165 A | 2/2013 |
| KR | 10-2005-0044047 A | 5/2005 |
| KR | 10-2009-0006504 A | 1/2009 |
| KR | 10-2009-0062435 A | 6/2009 |
| KR | 10-2013-0050749 A | 5/2013 |
| KR | 10-2014-0113256 A | 9/2014 |
| KR | 10-2016-0015004 A | 2/2016 |
| WO | WO 2013/109040 A1 | 7/2013 |

OTHER PUBLICATIONS

Korean Notice of Allowance dated May 31, 2016 corresponding to Korean Application No. KR 10-2014-0142568.
International Search Report dated Nov. 10, 2015, corresponding to International Publication No. PCT/KR2015/008090.
Chinese Office Action dated Jan. 11, 2019, corresponding to Chinese Patent Application No. 201580051314.7.
The extended European search report dated Jun. 14, 2017 in connection with the counterpart European Patent Application No. 15851834.0.

* cited by examiner

DEVICE-TO-DEVICE CONTENT PROVIDING METHOD

CROSS-REFERENCE TO RELATED APPLICATION

This application is a continuation of International Application No. PCT/KR2015/008090, filed Aug. 3, 2015, which claims the priority to and the benefit of Korean Patent Application No. 10-2014-0142568 filed in the Korean Intellectual Property Office on Oct. 21, 2014. The disclosures of above-listed applications are hereby incorporated by reference in their entirely

TECHNICAL FIELD

The present disclosure relates to a device-to-device (D2D) content providing method, and relates to a method for enabling D2D content transmission through a link with a communication control server for supporting D2D content transmission.

BACKGROUND

Details disclosed herein merely offer background information regarding embodiments and are not applicable as prior art.

With the development of communication devices and systems, users need a service which allows the user to easily obtain or share desired information at any time. With the recent advent of a smart phone and a tablet PC, an environment for obtaining and sharing various kinds of information through a communication system is already constructed. However, the inventor b(s) has experienced that the communication system has a problem of failing to effectively provide real-time information due to system complexity or time delay.

Therefore, Device-to-Device (D2D) communication technology that performs direct communication between devices is attracting attention.

The D2D communication refers to communication technology capable of establishing a direct communication link between devices and transmitting data without using infrastructures such as a base station when the devices are located within a close range from each other.

In this D2D communication, a device finds any other physically neighboring device, establishes a communication session, and transmits traffic. Thus, this has an advantage of solving a traffic overload issue by dispersing traffic concentrated on a base station. Nonetheless, the D2D communication today has a problem in having to perform complicated several procedures in which a device that supports a D2D communication module searches for other neighboring devices, sends a query about desired content to all the discovered devices, receives responses, identifies other device having the content, sends again a request for the content to the identified device, and receives the content.

SUMMARY

In order to accomplish the above objects, a device-to-device (D2D) content providing method according to an embodiment of the present disclosure may comprise steps of: at a device, creating a neighboring device list by discovering at least one connectible neighboring device; at the device, transmitting a D2D communication request for content to a communication control server, the request including the neighboring device list and information about an available communication interface; at the device, receiving, from the communication control server, information about one or more content providing devices selected from among neighboring devices contained in the neighboring device list, based on the information about the communication interface; and at the device, requesting and receiving content from the content providing device.

In order to accomplish the above objects, a device-to-device (D2D) content providing method according to an embodiment of the present disclosure may comprise steps of: at a communication control server for controlling D2D communication, receiving a D2D communication request for content from one device, the request including a neighboring device list; at the communication control server, identifying a device list of other devices having the content requested by the device by interworking with a device management server for managing information about devices having contents; at the communication control server, selecting one or more content providing devices by checking the neighboring device list received from the device and the device list identified through the device management server; and at the communication control server, if the selected content providing devices exist more than two, extracting a final content providing device by comparing information about communication interfaces available in the device with information about communication interfaces available in each of the content providing devices and then transmitting information about the final content providing device to the device, or arranging the content providing devices according to predetermined priorities of communication interfaces and then transmitting a list of the arranged content providing devices to the device.

DETAILED DESCRIPTION

Hereinafter, embodiments of the present disclosure will be described with reference to the accompanying drawings. In the description of embodiments of the present disclosure, well known functions or elements may not be described or illustrated in detail to avoid obscuring the subject matter of the present disclosure. While the following description is particularly shown and described with reference to exemplary embodiments thereof, the following description of exemplary embodiments is provided for illustration purpose only and not for the purpose of limiting the disclosure as defined by the appended claims and their equivalents.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically or physically coupled to or connected to another element. Namely, the element may be directly coupled or connected to another element, or a new element may exist between both elements.

Also, the terms used in describing various embodiments of the present disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Now, a D2D content providing method according to embodiments of the present disclosure and a computer-readable storage medium recording thereon a program for the method will be described in detail with reference to the drawings. Through the drawings, the same or similar reference numerals denote corresponding features consistently.

At the outset, the configuration of a system according to an embodiment of the present disclosure will be described.

Figure 1:
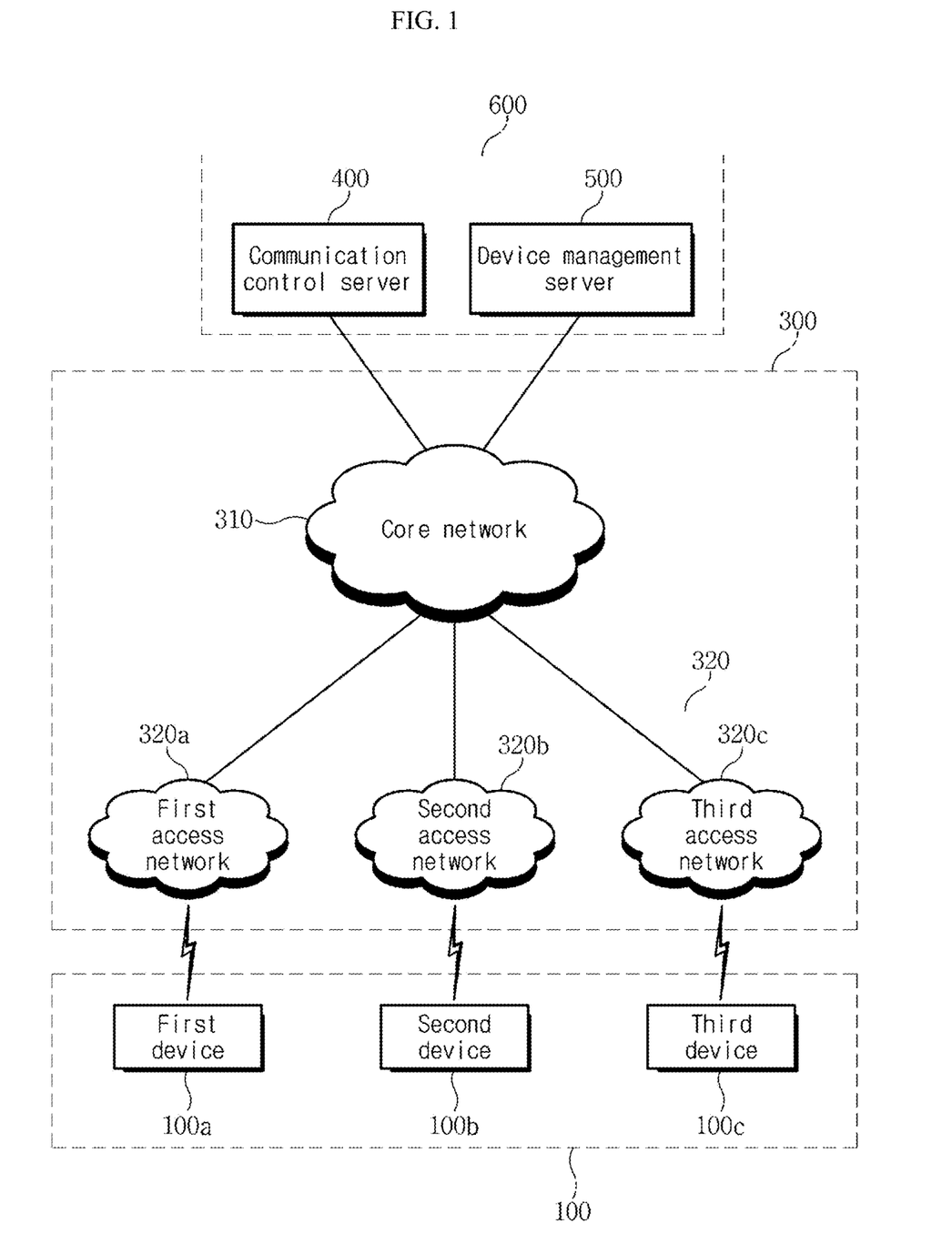
FIG. 1 is an exemplary diagram illustrating main elements of a system according to one or more embodiments.

FIG. 1 is an exemplary diagram illustrating main elements of a system according to one or more embodiments.

Referring to FIG. 1, the system according to one or more embodiments of the present disclosure supports content transmission between a plurality of devices 100*a*, 100*b* and 100*c* (hereinafter, denoted by 100 if no separate distinction is required) and, especially, supports communication between the devices 100 through interworking with a communication control server 400 that controls D2D communication and with a device management server 500 that manages a list of devices.

Describing each element, the plurality of devices 100 refers to user devices capable of transmitting or receiving various kinds of data depending on users' manipulations. Particularly, the device 100 according to one or more embodiments of the present disclosure may support direct transmission/reception of content between devices in a device-to-device (D2D) communication manner without passing through a communication network 300. Namely, the device 100 according to one or more embodiments of the present disclosure may create a neighboring device list by discovering one or more connectible neighboring devices and then transmit the list to the communication control server 400. Also, the device 100 may receive information about a specific content providing device specified by the communication control server 400 from among neighboring devices contained in the neighboring device list and then request and receive content from the specific content providing device.

In a normal D2D communication scheme, the device 100 discovers neighboring devices, identifies a device having desired content by sending a request for a content possession list to neighboring devices or querying whether there is the desired content and receiving responses, and then requests and receives the desired content from the identified device. In contrast, according to one or more embodiments of the present disclosure, when the device 100 provides information about neighboring devices to the communication control server 400, the communication control server 400 selects an optimal content providing device from among neighboring devices as to the device 100 and offers related information to the device 100. Then the device 100 requests and receives content from the optimal content providing device. This is different from a normal D2D communication scheme.

Additionally, the device 100 of the present disclosure may request specific content of the content providing device and receive a complete form of a content file from the content providing device. In this case, if there are two or more content providing devices, and if such content providing devices store lots of fragments of a content file in a distributed manner, the device 100 may receive such fragments of the content file in parallel from the content providing devices and then combine them into a single content file. Also, the device 100 may operate as a content providing device with regard to other devices.

Further, the device 100 of the present disclosure may transmit or receive information to or from the communication control server 400 or the device management server 500 via the communication network 300. For this, the device 100 of the present disclosure may include a browser for transmission and reception of information, a memory for storing programs and protocols, a microprocessor for executing, operating and controlling various kinds of programs, and the like.

The communication control server 400 performs a function of controlling transmission of content between the devices 100. In particular, the communication control server 400 according to one or more embodiments of the present disclosure registers and manages information about the devices 100 which participate in D2D communication. Also, when a request for D2D communication regarding specific content, including a neighboring device list, is received from a specific device 100, the communication control server 400 may select a device having the content requested by the device 100 from among neighboring devices contained in the neighboring device list, and then offer this information about a content providing device to the device 100.

Additionally, if there are two or more devices having the content requested by the device 100, the communication control server 400 may select a content providing device in accordance with a particular rule and then offer selection information to the device 100.

The device management server 500 is an element for managing information about a plurality of devices 100 which participate in D2D communication. The device management server 500 of the present disclosure may receive, from the communication control server 400, information about content requested by the device 100, and manage it as information about content possessed by the device 100. Also, the device management server 500 may receive, from the communication control server 400, a content possession list offered by the device 100 and manage it as information about content possessed by the device 100.

Such devices 100 that participate in D2D communication refer to a device which stores all or part of specific content and is capable of requesting and receiving content from other device or providing content at the request of other device. These devices 100 may be classified into a seeder storing the whole content for sharing and a leecher storing some segments smaller than the original size of content for sharing. In addition, the seeder may include a device downloading the whole content for sharing from other device as well as a device initially providing content for sharing. The device management server 500 stores and manages information about such possessed contents with regard to the devices 100 that participate in D2D communication.

Although the communication control server 400 and the device management server 500 of the present disclosure are shown as a separate form in the drawing, this is exemplary only. The communication control server 400 and the device management server 500 may exist as a single form of a device optimization server 600, or the communication control server 400 may perform the function of the device management server 500.

Details about main elements and operation methods of the device 100 and the communication control server 400 will be described below. A processor equipped in the device 100 and in the communication control server 400 according to one or more embodiments of the present disclosure may process program instructions for performing the method according to the present disclosure. This processor may be a single-threaded processor in one embodiment and a multi-threaded processor in another embodiment. Further, this processor may process commands stored in a memory or storage.

The system according to one or more embodiments of the present disclosure may be configured to further include a content providing apparatus (not shown). The content providing apparatus (not shown) performs a function of providing content to the device 100. If there is no neighboring device as to the first device 100*a* that requests content, or if there is no neighboring device having content requested by the first device 100*a*, the first device 100*a* may request and receive the content from the content providing apparatus (not shown) under the control of the communication control server 400.

Additionally, the devices 100, the communication control server 400 and the device management server 500 according to one or more embodiments of the present disclosure may transmit or receive information through the communication network 300.

The communication network 300 may use various forms of communication networks, for example, wireless communication schemes, such as WLAN (Wireless LAN), Wi-Fi, Wibro, Wimax, and HSDPA (High Speed Downlink Packet Access), or wired communication schemes, such as Ethernet, xDSL (ADSL, VDSL), HFC (Hybrid Fiber Coaxial cable), FTTC (Fiber to the Curb), and FTTH (Fiber to the Home). In addition to the above communication schemes, any other communication scheme which is well known or to be developed may be used.

Also, the communication network 300 may include a plurality of access networks 320*a*, 320*b* and 320*c* (hereinafter, denoted by 320 if no separate distinction is required) for supporting communication access of the device 100, and a core network 310. The core network 310 of the present disclosure supports a connection between the access networks 320 and may support a connection between the one or more access networks 320 and any other communication network. The core network 310 of the present disclosure may be implemented as an IP network, for example.

The access networks 320 may have different communication coverage and transmit or receive information to or from the device 100 located in the corresponding communication coverage. The access network 320 may be connected to the device 100, based on various communication schemes, e.g., mobile communication such as Wi-Fi communication, LTE, and 3G, Bluetooth communication, and the like. Also, the access network 320 may be implemented to include one or more base station apparatuses which not only detect the device 100 approaching the communication coverage, but also perform an access control and radio resource allocation for the access-requesting device 100, information transmission/reception of the device 100 through the allocated radio resource, and the like. The base station apparatus may be, for example, eNB (e Node B) in the LTE standard, and Wi-Fi AP (Access Point).

The device 100 according to one or more embodiments of the present disclosure may be connected with the access network 320 of various schemes. For example, the first device 100*a* may be connected with only the first access network 100*a* of Wi-Fi communication scheme. On the other hand, the second device 100*b* may be connected with both the first access network 100*a* of Wi-Fi communication scheme and the second access network 100*b* of LTE communication scheme. Also, the third device 100*c* may be connected with the third access network 100*c* of 3G communication scheme as well. In this case, for using a specific service, the device 100 that supports various communication schemes may be connected with the core network 310 through the access network 320 that supports one of communication schemes.

Additionally, the device 100 according to one or more embodiments of the present disclosure may be configured to include an interface module for a connection with the access network 320 and also include an interface module for supporting a D2D communication function. When the interface module that supports the D2D communication function is activated, the device 100 may discover one or more connectible neighboring devices and create a neighboring device list.

This will be described with reference to FIG. 2.

Figure 2:
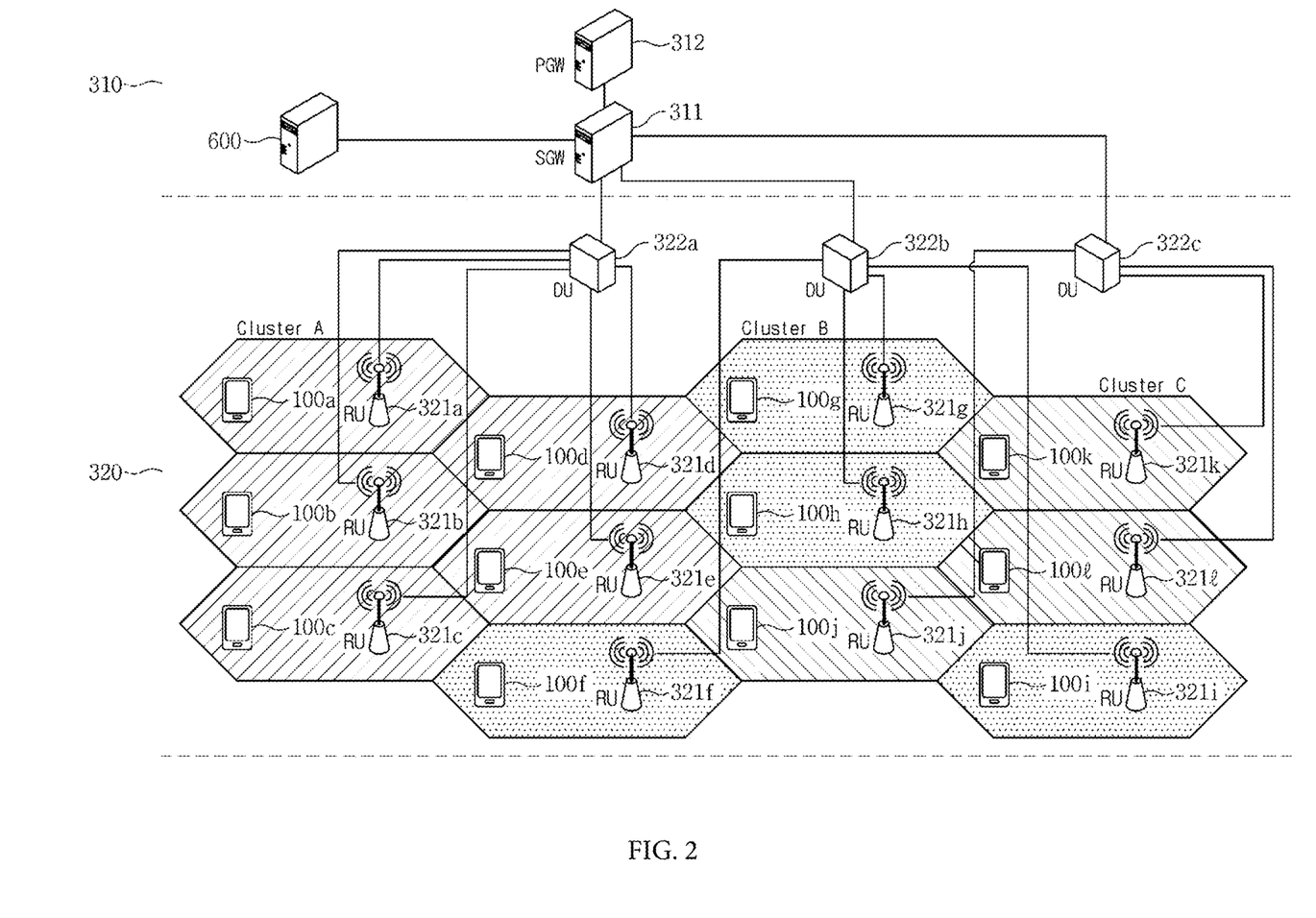
FIG. 2 is an exemplary diagram illustrating a method for discovering a neighboring device according to one or more embodiments.

FIG. 2 is an exemplary diagram illustrating a method for discovering a neighboring device according to one or more embodiments.

The core network 310 forming the communication network 300 of the disclosure may be configured to include a serving gateway (hereinafter referred to as SGW) 311, a packet data network gateway (hereinafter referred to as PGW) 312, and a mobility management entity (MME, not shown).

The SGW 311 is an end point of the core network 310 and the access network 320 and performs an anchoring function for the movement of the device 100 between the access networks 320. For example, in the LTE network, the SGW 311 may perform the function of a mobility anchor at the handover of the device 100 and the function of a mobility anchor at a movement in the 3GPP radio network. The core network 310 includes one or more SGWs 311, and each SGW 311 may be connected with one or more base station apparatuses of the access network 310 through a converged switch or the like.

The PGW 312 is a point of contact with other communication networks such as IP multimedia subsystem (IMS), Internet, or a mobile communication network of other communication provider, and is responsible for anchoring as to the movement of the device 100 between communication networks. Specifically, the PGW 312 may assign an internet protocol (IP) address to the device 100. Also, the PGW 312 may perform the function of a mobility anchor in case of a movement between different type networks (e.g., 3GPP wireless network and non-3GPP wireless network). In addition, the PGW 312 determines a bearer band to be provided to the device 100. Also, the PGW 312 performs forwarding and routing functions for packet. And also, the PGW 312 may perform a QoS policy application, a traffic control, and a charging process for each device 100 by interworking with a policy and charging rules function (PCRF) (not shown). This PGW 312 is connected with one or more SGWs 311 as lower nodes. For reference, the communication control server 400 and the device management server 500 according to the present disclosure may be connected with the SGW 311. If the communication control server 400 and the device management server 500 exist in a single form, the device optimization server 600 may also be connected with the SGW 311.

The access network 320 forming the communication network 300 of the present disclosure may be implemented as one or more base station apparatuses that transmit or receive data. This base station apparatus may be composed of a radio unit (RU) for processing radio signals and a digital unit (DU) for converting radio signals into digital data and performing data processing in accordance with a communication protocol. The RU may be referred to as a remote radio head (RRH), and the DU may be referred to as a base band unit (BBH).

The RU and the DU may be implemented in a united form at the same place or separately constructed at remote places while connected through an optical cable or a cable. Recently, the latter structure which is advantageous relatively in view of network construction cost and operation convenience is widely used.

FIG. 2 shows the access network based on the latter structure. Referring to FIGS. 1 and 2, the access network 320 may be configured to include the RUs 320a~320i that are installed in respective cells, which divide from a service target area in the unit of communication coverage, and perform radio access and data transmission/reception with the devices 100a~100i located in the communication coverage of corresponding cells, and the one or more DUs 322a~322c that are connected with the RUs 320a~320i and perform processing of radio data transmitted to or received from the RUs 320a~320i.

Based on this structure of the communication network 300, the devices 100a~100i may perform a process of discovering neighboring devices through interworking with the RUs 321a~321i and the DUs 322a~322c. At this time, in order to discover neighboring devices, the device 100 identifies location information of neighboring devices through interworking with the RUs 321a~321i and the DUs 322a~322c. Herein, the location information may include cell identification information (Cell ID) for distinguishing cells each of which is communication coverage of each RU 321a~321i, DU identification information (DU ID) for identifying the one or more DUs 322a~322c each of which is connected with the one or more RUs 321a~321i, and IP information of the device 100. Further, the location information may include one or more of SGW identification information (SGW ID) for identifying the SGW 311 connected with the DUs 322a~322c, PDN gateway identification information (PGW ID) for identifying the PGW 312 connected with the one or more SGW 311, communication network operator information, and national information.

The device 100 may receive such information from the MME (not shown) of the core network 322 with which the DUs 322a~322c interwork, or request and receive such information from the MME (not shown) of the core network 322 via the DUs 322a~322c.

Each of the devices 100a~100i may create a neighboring device list by using the identified information. For example, the first device 100a may identify the location information about the second, third, fourth and fifth devices 100b, 100c, 100d and 100e located nearby within a certain range through the accessed first RU 321a and the first DU 322a connected with the first RU 321a. Also, the first device 100a may create a neighboring device list that contains IP address information of the second, third, fourth and fifth devices 100b, 100c, 100d and 100e.

Additionally, the device 100 according to one or more embodiments of the present disclosure may obtain identification information (IP address information) about at least one other device through a D2D discovery message transmitted and received within a specific range, or obtain identification information, i.e., IP address information, about at least one other device by emitting a D2D discovery message within a specific range and receiving a response message. Namely, the first device 100a may obtain identification information about the second and fourth devices 100b and 100d by using D2D discovery messages transmitted to and received from the second and fourth devices 100b and 100d which are located within a specific range. Also, the first device 100a may broadcast D2D discovery messages within a specific range and then, if response messages are received from the second and fourth devices 100b and 100d, create a neighboring device list by defining the second and fourth devices 100b and 100d as neighboring devices.

Additionally, the devices 100a~100i according to one or more embodiments of the present disclosure may establish priorities of the discovered other devices by using the identified location information, and preferentially select a specific other device having a higher priority as a neighboring device. Such priorities may be established in the order of Cell ID, DU ID, SGW ID, PGW ID, communication network operator information, and national information. According to this, neighboring devices may be selected in the order of devices located in the same cell, the same DU, the same serving gateway, the same PDN gateway, the same operator network, and the same nation.

Additionally, when creating a neighboring device list, the device 100a~100i according to one or more embodiments of the present disclosure may calculate a content transmission quality factor between devices having the identified location information, select a device only having the calculated content transmission quality factor greater than a given value, and then create the neighboring device list. The content transmission quality factor may be calculated using received signal strength or signal to noise ratio (SNR) between devices.

Hereinafter, main elements and an operation method of the device 100 according to one or more embodiments of the present disclosure will be described.

Figure 3:
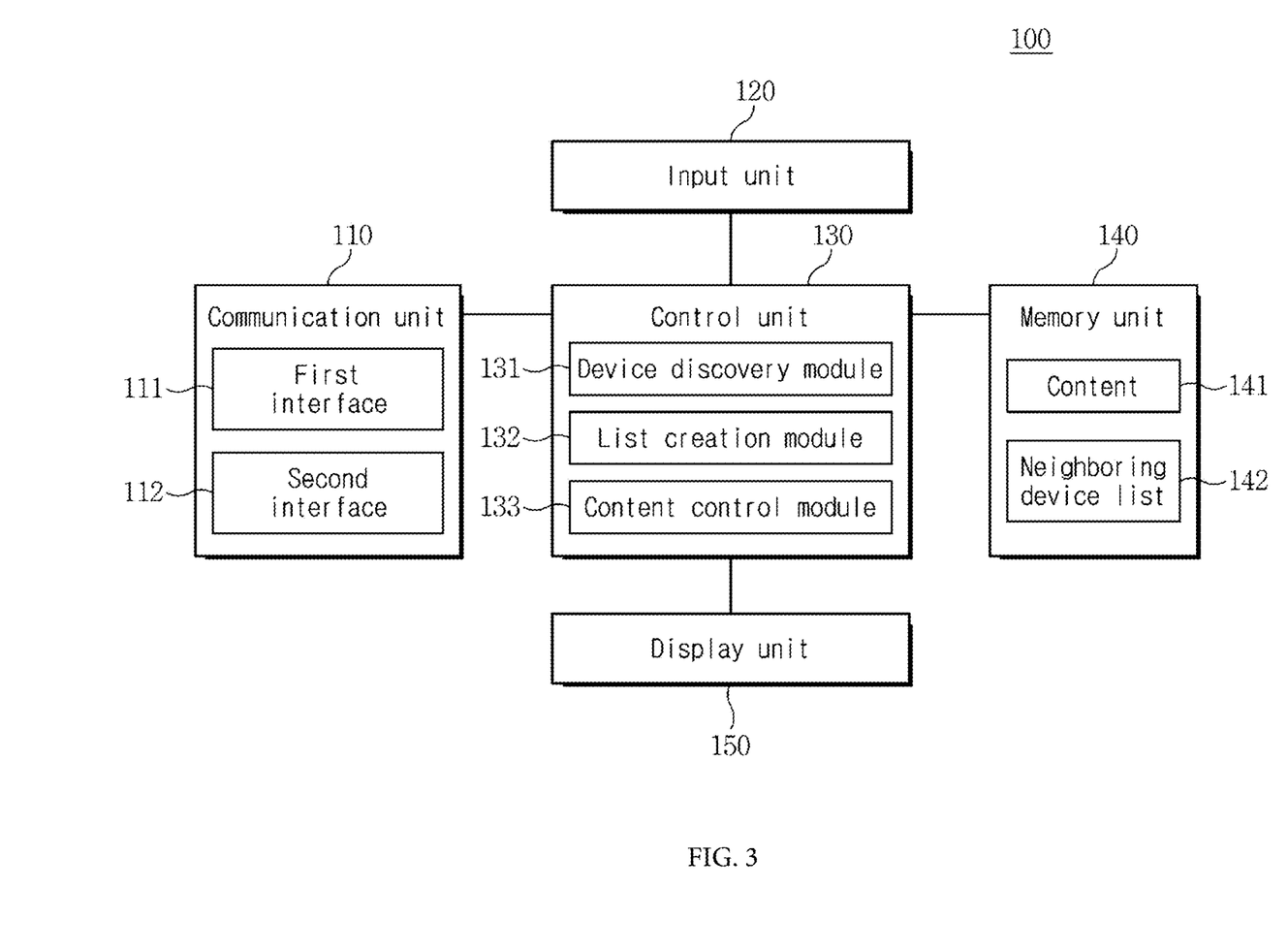
FIG. 3 is an exemplary block diagram illustrating main elements of a device shown in FIG. 1 according to one or more embodiments.

FIG. 3 is an exemplary block diagram illustrating main elements of a device shown in FIG. 1 according to one or more embodiments.

Referring to FIGS. 1 and 3, the device 100 according to one or more embodiments of the present disclosure may be configured to include a communication unit 110, an input unit 120, a control unit 130, a memory unit 140, and a display unit 150.

Respective elements will be described in detail. The communication unit 110 performs a function of supporting transmission and reception of various kinds of information. Particularly, the communication unit 110 according to one or more embodiments of the present disclosure may be configured to include a first interface 111 for supporting D2D communication and a second interface 112 for supporting access to the communication network 300. On the one hand, the first interface 111 may be activated under the control of the control unit 130 and then perform a process of discovering neighboring devices. On the other hand, the second interface 112 may perform a process of accessing the access network 320 of the communication network 300 under the control of the control unit 130.

The access network 320 of the present disclosure may support various communication schemes, and thus the second interface 112 may be configured to include at least one of a Wi-Fi module, an LTE communication module, a 3G communication module, and a Bluetooth communication module.

Additionally, the second interface 112 may support a process of accessing the access network 320 by activating various communication modules in accordance with user's setting or a predefined manner. For example, if the Wi-Fi communication performance is lower than predefined communication performance in a state of accessing through the Wi-Fi module the access network 320 that supports the Wi-Fi communication scheme, the second interface 112 may trigger the LTE communication module and support the whole process of transferring to the access network 320 that supports the LTE communication scheme.

Also, under the control of the control unit 130, the second interface 112 of the present disclosure may transmit a D2D communication request to the communication control server 400 or the device management server 500 via the communication network 300. Then the second interface 112 may receive a corresponding response from the communication control server 400 or the terminal management server 500.

The input unit 120 delivers, to the control unit 130, various kinds of information entered by a user and a signal entered in connection with setting or controlling various functions of the device 100. Particularly, the input unit 120 of the present disclosure may activate the first interface 111 or support a user's input of a uniform resource locator (URL) for a content request.

The input unit 120 may include a key input tool such as a keyboard or a keypad, a touch input tool such as a touch sensor or a touch pad, a voice input tool, and a gesture input tool having at least one of a gyro sensor, a geomagnetic sensor, an acceleration sensor, a proximity sensor, and a camera. Besides, all kinds of input tools being developed or to be developed may be included.

The control unit 130 performs the overall control of the device 100. In view of hardware, the control unit 130 may be configured to include at least one processor such as a central processing unit (CPU) and a micro processing unit (MPU), at least one execution memory (e.g., a register and/or a random access memory (RAM)) onto which data is loaded, and a bus for inputting or outputting data to or from the processor and the memory. In view of software, the control unit 130 may be configured to include a program routine or program data loaded onto the execution memory from a recording medium and then processed by the processor so as to perform a function defined in the device 100. Namely, any processable element in view of software among functions possessed by the device 100 so as to support the D2D content providing method according to one or more embodiments of the present disclosure may be considered as a function of the control unit 130.

The control unit 130 of the present disclosure is functionally connected with one or more elements equipped to support the D2D content providing method according to one or more embodiments of the present disclosure. Namely, the control unit 130 is functionally connected with the communication unit 110, the input unit 120, the memory unit 140, and the display unit 150, and controls the supply of power to each element and the flow of signals for performing functions.

In particular, the control unit 130 according to one or more embodiments of the present disclosure may perform a process of discovering neighboring devices and creating a neighboring device list of the discovered neighboring devices. Herein, the neighboring device list may be created by the control unit 130 when a specific site or application is executed for using a service and then a request for specific content occurs or when the first interface 111 of the communication unit 110 is activated.

In order to create the neighboring device list, the control unit 130 of the present disclosure may obtain identification information about at least one other device through a D2D discovery message transmitted and received within a specific range, obtain identification information about at least one other device by emitting a D2D discovery message within a specific range and receiving a corresponding response message, or obtain identification information about at least one other device through interworking with the DU connected with one or more RUs located in the access network accessed by the device. Then the control unit 130 may create the neighboring device list by defining the obtained identification information about other device as a neighboring device. The neighboring device list of the present disclosure may contain, as identification information, IP address information about a neighboring device.

The control unit 130 according to one or more embodiments of the present disclosure may create the neighboring device list by selecting, from among the discovered devices, only the device having a content transmission quality factor greater than a given value. For this, the control unit 130 of the present disclosure may transmit a signal for calculation of a content transmission quality factor to the discovered other device and then calculate the content transmission quality factor by computing a transmission rate, etc., based on a response. Namely, the control unit 130 may calculate the content transmission quality factor by using received signal strength, SNR, or the like. Also, the control unit 130 of the present disclosure may query the discovered other device about whether there is any other device connected thereto. If a response indicates that several devices are connected to the discovered other device, this device may be excluded from the selection of neighboring devices. Namely, the control unit 130 may preferentially select, as the neighboring device, a certain device having no or less connection with other device.

Additionally, when the neighboring device list is created, the control unit 130 may transmit a D2D communication request to the communication control server 400 together with information about content to be used. At this time, the control unit 130 of the present disclosure may also transmit information about any available communication interface to the communication control server 400.

Additionally, the control unit 130 of the present disclosure may also transmit a content possession list, which is a list of one or more possessed contents, to the communication control server 400. The content possession list may be utilized as information required for the device 100 to operate as a content providing device as to other device under the control of the communication control server 400.

Additionally, the control unit 130 may receive information about a content providing device selected, from among neighboring devices contained in the neighboring device list, by the communication control server 400 capable of providing content. When the information about the content providing device is received, the control unit 130 may request and receive content from the corresponding content providing device. At this time, since identification information (IP address) of the content providing device is already contained in the neighboring device list, the control unit 130 may immediately request and receive the content from the content providing device without any process of discovering the content providing device.

On the other hand, if there is no neighboring device as the result of discovery, the control unit 130 may transmit, to the communication control server 400, a D2D communication request for specific content by including only information about an available communication interface, and receive, from the communication control server 400, response information about a content providing device which is not neighboring but has the content. Also, the control unit 130 may receive address information about a content server (not shown) having the content from the communication control server 400. Thereafter, using the received information, the control unit 130 may request and receive the content from the content providing device or the content server (not shown).

The control unit 130 that receives the content through the above process may store temporarily or permanently the received content in the memory unit 140. Also, the control unit 130 may control a process of transmitting the temporarily or permanently stored content to other device in response to a request of the other device. That is, in the D2D communication manner, the device 100 of the present disclosure may receive content from any other device and provide content to any other device.

In order to perform the above-discussed process, the control unit 130 according to one or more embodiments of the present disclosure may be configured to include a device discovery module 131, a list creation module 132, and a content control module 133.

Also, as identification information about the device of the present disclosure, any information for distinguishing between devices 100, in addition to IP address information, such as an international mobile equipment identity (IMEI), a personal identification number (PIN), an IMSI, a unique universal identifier (UUID), a UDID, a mobile identification number (MIN), a mobile subscription identification number (MSIN), a mobile directory number (MDN), and a mobile station international ISDN number (MSISDN).

The memory unit 140 may temporarily store application programs required for the operation of functions according to one or more embodiments of the present disclosure and various data created during the execution of the application programs. Particularly, the memory unit 140 according to one or more embodiments of the present disclosure may store content 141. Further, the memory unit 140 may store a neighboring device list 142 created by the control unit 130. Information stored in the memory unit 140 may be maintained temporarily or permanently.

The memory unit 140 may include mainly a program region and a data region. The program region stores related information for the operation of the device 100, such as an operating system (OS) for booting the device 100. The data region stores data created by the use of the device 100, and may store the content 141 and the neighboring device list 142 as mentioned above. The memory unit 140 may be formed of storage media such as a flash memory, a hard disk, a multimedia card micro type memory (e.g., SD or XD memory, etc.), RAM, and ROM.

The display unit 150 displays information about an operating status and an operating result produced during the execution of functions of the device 100. Particularly, the display unit 150 of the present disclosure may display various kinds of information associated with the use of content.

The display unit 150 of the present disclosure may be implemented in the form of a single touch panel (or touch screen) together with the input unit 120. In this case, the display unit 150 may display various kinds of information produced according to user's touch action.

Additionally, the display unit 150 may be formed of a liquid crystal display (LCD), a thin film transistor LCD (TFT-LCD), an organic light emitting diodes (OLED), an LED, an active matrix organic LED (AMOLED), a flexible display, a 3-dimensional display, or the like. Some of them may have a transparent or light-penetrate form through which the outside can be seen. This may be configured in the form of a transparent display including a transparent OLED (TOLED).

Hereinbefore, main elements of the device 100 are described through FIG. 3. The elements shown in FIG. 3 are, however, not always essential, and more or less elements than shown may be used for the device 100. For example, the device 100 may further include an audio output unit (not shown) for converting an electric audio signal into an analog signal and then outputting the signal. This audio output unit (not shown) may perform a function of supporting the output of various kinds of information associated with content.

Additionally, the main elements of the devices 100 shown in FIG. 3 may be varied in position for convenience or any other reason. Although only the device discovery module 131, the list creation module 132, and the content control module 133 are shown as modules for constituting the control unit 130, the present disclosure is not limited to that. The control unit 130 may be formed of various modules for performing various functions.

Hereinbefore, the main elements and operation method of the device 100 according to one or more embodiments of the present disclosure are described. The device 100 of the present disclosure may be implemented in various forms. For example, the device 100 disclosed herein may be a mobile device such as a smart phone, a tablet PC, a personal digital assistants (PDA), a portable multimedia player (PMP), and an MP3 player, or a stationary device such as a smart TV, and a desktop computer.

According to a recent trend of convergence in digital devices, a great variety of mobile devices or their equivalences may be used as the device 100 of the present disclosure. Furthermore, any device that can communicate between devices and transmit or receive information to or from the communication control server 400 via the communication network 300 may be used as the device 100 of the present disclosure.

Hereinafter, main elements and an operation method of the communication control server 400 according to one or more embodiments of the present disclosure will be described.

Figure 4:
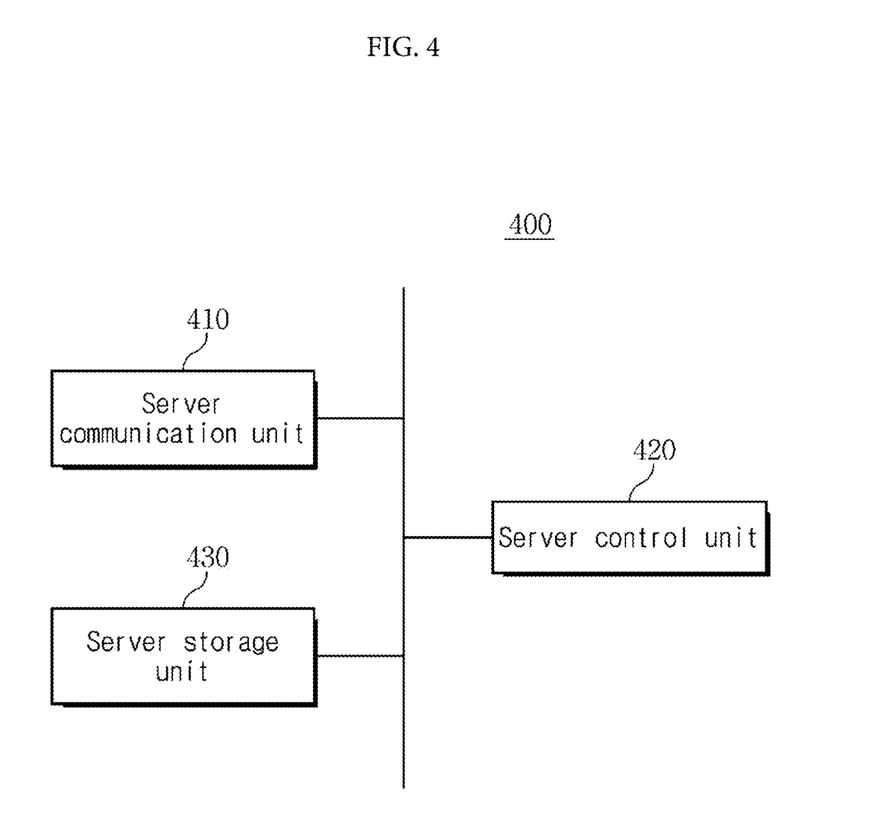
FIG. 4 is an exemplary block diagram illustrating main elements of a communication control server shown in FIG. 1 according one or more embodiments.

FIG. 4 is an exemplary block diagram illustrating main elements of a communication control server shown in FIG. 1 according to one or more embodiments.

Referring to FIGS. 1 and 4, the communication control server 400 according to one or more embodiments of the present disclosure may be configured to include a server communication unit 410, a server control unit 420, and a server storage unit 430.

The server communication unit 410 supports a function of transmitting or receiving information to or from the one or more devices 100 through the communication network 300.

For example, the server communication unit 410 of the present disclosure may receive a D2D communication request from any one of the devices 100 and transmit a response message to the device 100.

The server control unit 420 performs the whole control of the communication control server 400 according to one or more embodiments of the present disclosure.

Particularly, the server control unit 420 according to one or more embodiments of the present disclosure may receive a D2D communication request for content, including a neighboring device list and information about an available communication interface, from one of the devices 100 through the server communication unit 410. At this time, the server control unit 420 may further receive a content possession list, which is a list of possessed contents, from the device 100 through the server communication unit 410.

Thereafter, in case of directly managing information about devices having contents, the server control unit 420 may check information about any other device having content in the neighboring device list received from the device 100, extract the other device as a content providing device, and provide this information to the device 100. If there are two or more content providing devices, the server control unit 420 may check information about a communication interface received from the device 100 and information about a communication interface as to each of other devices having contents, then extract one of the content providing devices or arrange the content providing devices on the basis of priority for the communication interface, and provide related information to the device 100.

On the other hand, if the device management server 500 manages information about devices which participate in D2D communication, the server control unit 420 may check information about other devices having contents through interworking with the device management server 500. For this, the server control unit 420 may perform a process of delivering information about the content requested by the device 100 to the device management server 500 or delivering a content possession list received from the device 100 to the device management server 500 and thereby supporting the device management server 500 that manages information about devices participating in D2D communication and information about contents possessed by respective devices.

Additionally, information about a communication interface of the device 100 may be varied in real time. The device 100 that participates in D2D communication may provide information about an available communication interface to the communication control server 400. Then, by considering this information, the communication control server 400 may change a content providing device in real time or notify this to the device 100 and thereby support the device 100 that uses content.

The server storage unit 430 stores all programs according to the execution of functions of the communication control server 400. In particular, the server storage unit 430 according to the present disclosure may store and manage information about devices 100 which participate in D2D communication. At this time, the server storage unit 430 may store information about content possessed by each of the devices 100 and about a communication interface available in the device, and the like.

The server storage unit 430 of the present disclosure may be a storage area located in the communication control server 400, or a data storage server which is located at the outside of the communication control server 400 and capable of data transmission/reception with the communication control server 400.

Hereinbefore, the main element and operation method of the communication control server 400 according to one or more embodiments of the present disclosure are described.

Hereinbefore, the communication control server 400 according to one or more embodiments of the present disclosure is described.

In view of hardware, the communication control server 400 according to one or more embodiments of the present disclosure has the same configuration as a typical web server or network server. However, in view of software, the communication control server 400 includes a program module implemented by means of computer languages such as C, C++, Java, Visual Basic, Visual C, and the like.

Additionally, the web server or network server refers to a computer system, or computer software (web server program) installed therefor, which is connected with many unspecified clients and/or other servers through an open-type computer network such as Internet, receives a task request from such a client or other web server, and provides a task result. However, the web server or network server should be understood as a broader concept including a series of application programs running thereon as well as the above-mentioned web server program and further including, in a certain case, various kinds of database constructed therein. The communication control server 400 may be implemented using various web server programs offered depending on the OS such as DOS, Windows, Linux, UNIX, Macintosh, etc. in hardware for a typical server. Representatively, website or IIS (Internet Information Server) used in the Windows environment and CERN, NCSA, APPACH, etc. used in the UNIX environment may be used.

Additionally, the communication control server 400 of the present disclosure may be implemented as one or more servers that operate in a server-based computing manner or cloud manner. Particularly, information transmitted or received through the system of the present disclosure may be offered through a cloud computing function which may be stored permanently in a cloud computing device on Internet.

Meanwhile, the memory or storage unit equipped in the device 100 and the communication control server 400 stores information therein. In one embodiment, the memory or storage unit is a computer-readable medium. The memory or storage unit may be a volatile memory unit in one embodiment and may be a nonvolatile memory unit in another embodiment. In various embodiments, the memory or storage unit may include, for example, a hard disk device, an optical disk device, or any other high-volume storage device.

In addition, the term "module" used herein may refer to a component or device which is formed of software, hardware, or combination thereof, and performs certain tasks. The module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the present disclosure or allow execution thereby. A computer-readable medium may be a machine-readable storage device, a machine-readable storage board, a memory device, a machine-readable composition of material affecting wave-type signaling, or a combination thereof.

Hereinafter, a D2D content providing method according to one or more embodiments of the present disclosure will be described.

Figure 5:
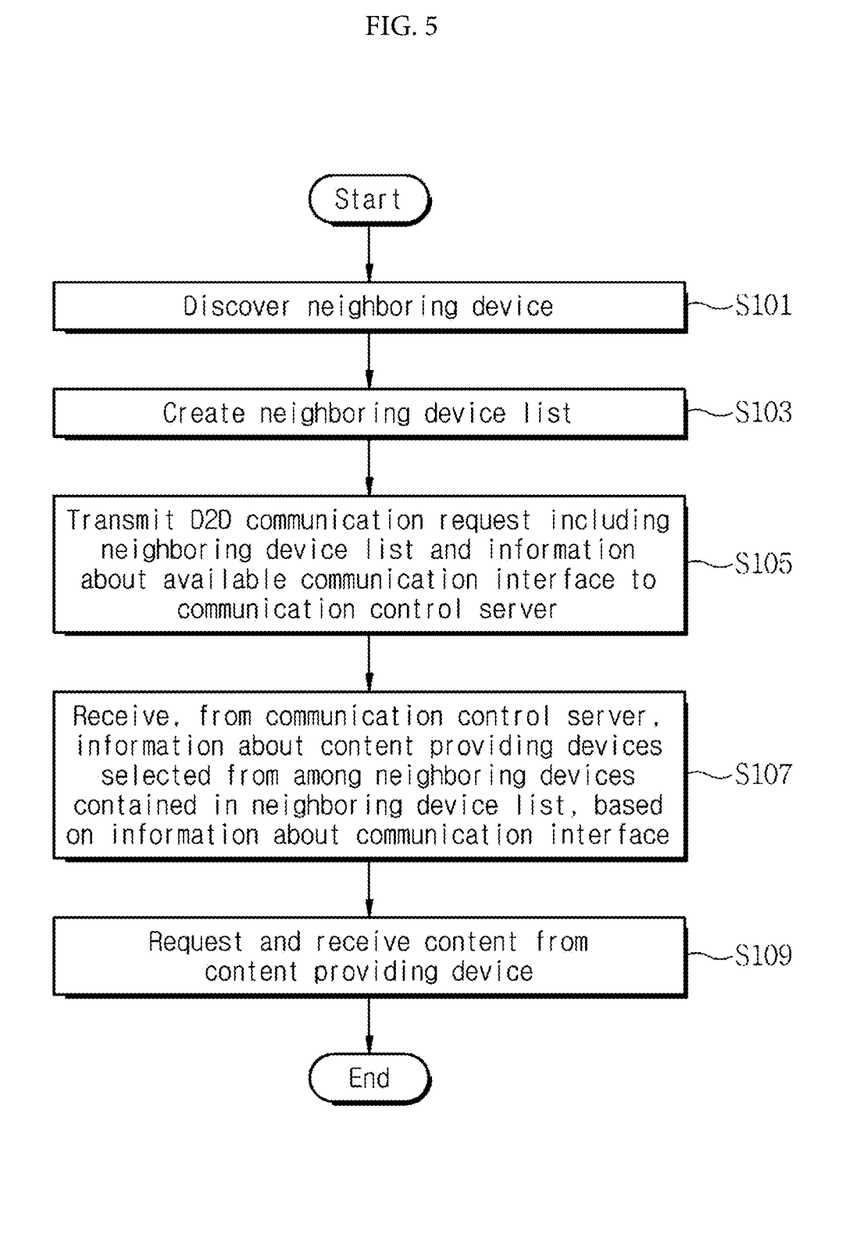
FIG. 5 is an exemplary flow diagram illustrating a D2D content providing method performed at a device according to one or more embodiments.

FIG. 5 is an exemplary flow diagram illustrating a D2D content providing method performed at a device according to one or more embodiments.

Referring to FIGS. 1 and 5, the device 100 of the present disclosure discovers a neighboring device (S101) which is connectible according as a module for supporting D2D communication, namely, the first interface 111 shown in FIG. 3, is activated. Herein, the first interface 111 may be activated by a user's request or through access to a specific service (e.g., access to an application) that supports D2D communication of the present disclosure.

Then the device 100 creates a neighboring device list as to the discovered neighboring devices (S103).

Thereafter, the device 100 transmits a D2D communication request for specific content, including the neighboring device list, to the communication control server 400 (S105). At this time, the D2D communication request may further include information about an available communication interface.

Thereafter, the device 100 may receive, from the communication control server 400, information about a content providing device selected from among neighboring devices contained in the neighboring device list, based on the information about the communication interface (S107).

For example, if the second and third devices 100b and 100c are contained as neighboring devices in the neighboring device list created by the first device 100a, the first device 100a may transmit the created neighboring device list together with the information about the available communication interface to the communication control server 400. Then the communication control server 400 checks information about the second and third devices 100b and 100c and identifies a device having the same content as content requested by the first device 100a. If only the second device 100b has the content requested by the first device 100a, the communication control server 400 may designate the second device 100b as a content providing device and then offer information about the second device 100b to the first device 100a. On the other hand, if both the second and third devices 100b and 100c have the content requested by the first device 100a, the communication control server 400 may check the information about communication interfaces of the second and third devices 100b and 100c and then select a device having the same communication interface as that of the first device 100a.

The device 100 that identifies the content providing device selected from among neighboring devices by the communication control server 400 through this process may request and receive content from the identified content providing device (S109).

In addition, at the step S105, the device 100 may further transmit a content possession list, which is a list of possessed contents, to the communication control server 400.

Hereinafter, the D2D content providing method according to embodiments of the present disclosure will be described in more detail.

Figure 6:
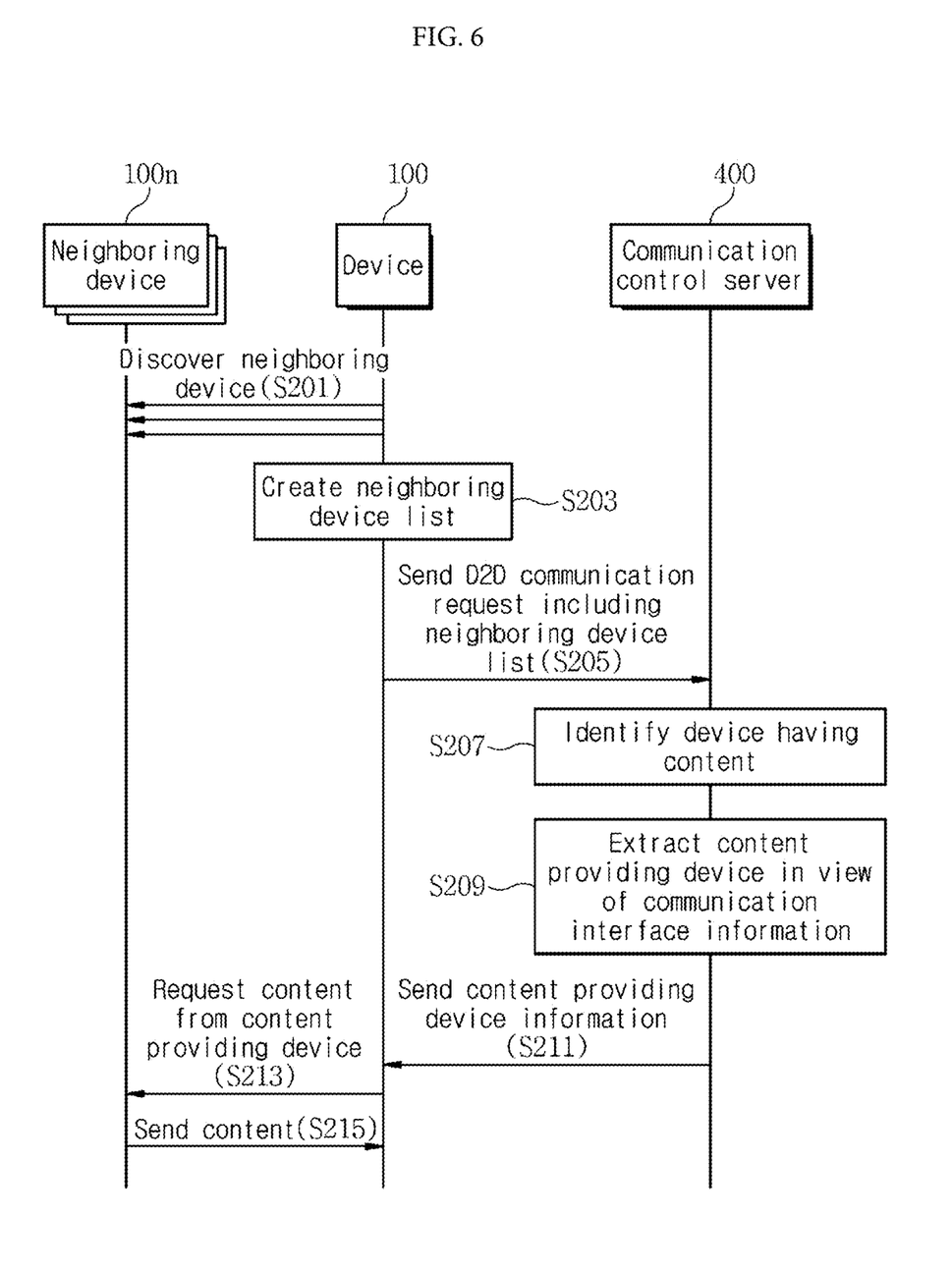
FIG. 6 is an exemplary flow diagram illustrating a D2D content providing method according to one or more embodiments.
Figure 7:
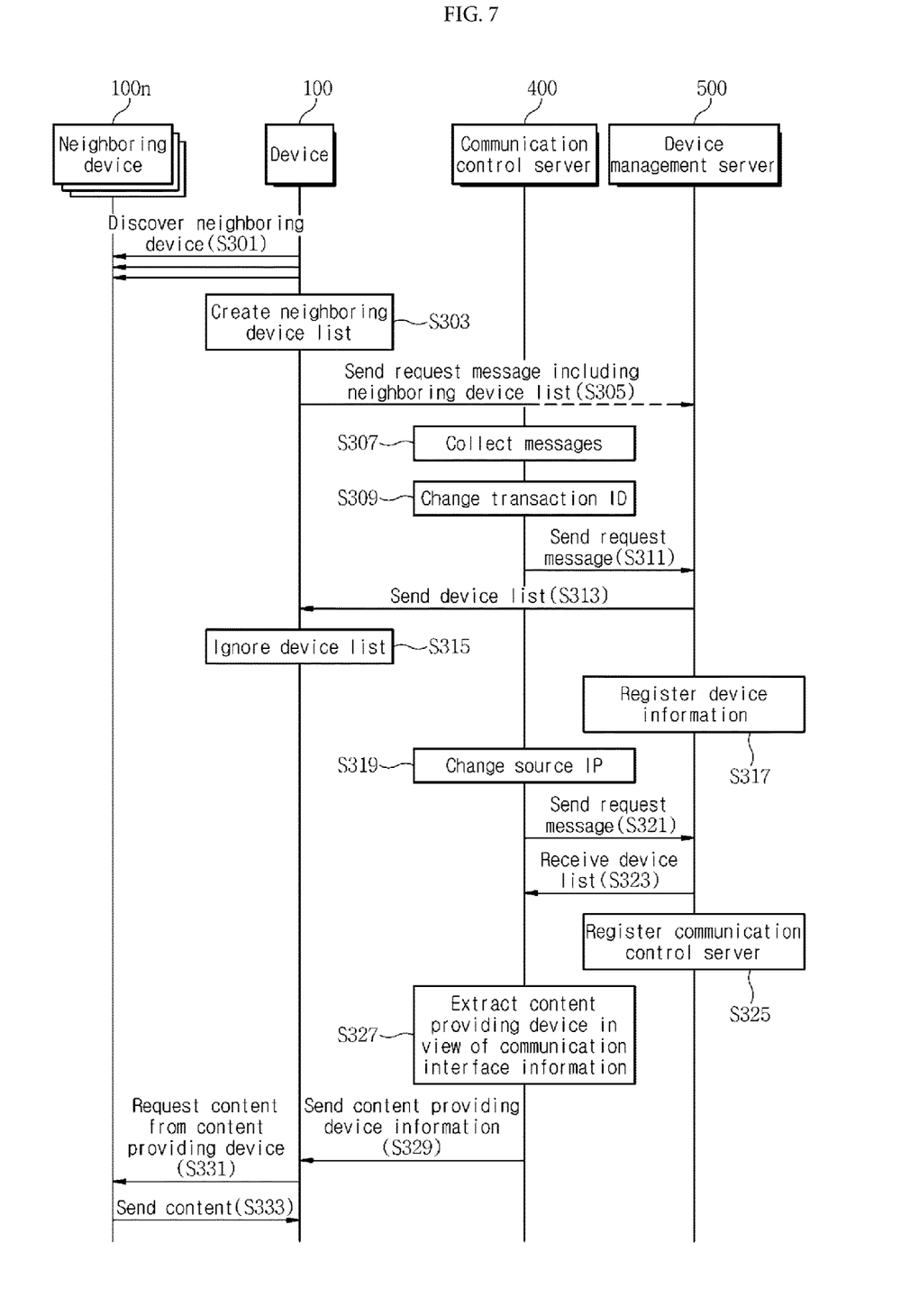
FIG. 7 is an exemplary flow diagram illustrating a D2D content providing method according to one or more embodiments.

FIG. 6 is an exemplary flow diagram illustrating a D2D content providing method according to one or more embodiments, and FIG. 7 is an exemplary flow diagram illustrating a D2D content providing method according to one or more embodiments.

Before description with reference to FIGS. 6 and 7, for convenience of explanation, let's suppose that the device 100 is a user's device which requests content, namely, requests D2D communication, and the neighboring device 100n is other user's device which neighbors near the device 100. The plural neighboring devices 100n may exist and the respective neighboring devices 100n may or may not have content requested by the device 100.

Additionally, the communication control server 400 of the present disclosure may store and manage information about all devices that participate in D2D communication. In this case, the information about all devices participating in D2D communication may be managed by the device management server 500, and the communication control server 400 may check a device list stored in the device management server 500, extract a content providing device by using this list, and provide related information to the device 100 that requests the D2D communication.

Referring to FIG. 6 first, a case where the communication control server 400 stores and manages the information about all devices participating in the D2D communication will be described.

In FIG. 6, the device 100 discovers one or more neighboring devices located within a specific range (S201). Also, the device 100 creates a neighboring device list that contains one or more neighboring devices (S203), and transmits a D2D communication request for specific content, including the created neighboring device list, to the communication control server 400 (S205).

The communication control server 400 that receives the request primarily checks information about other devices having the content requested by the device 100 (S207).

Thereafter, the communication control server 400 extracts a content providing device and transmits related information to the device 100. In this case, if there are two or more content providing devices, the communication control server 400 may compare information about a communication interface of the device 100 with information about a communication interface of each device contained in the device list transmitted from the device management server 500 and then extract the final content providing device (S211).

Additionally, the communication control server 400 is in a state where the device 100 requests specific content, and since the device 100 may be designated as a content providing device for another device, may store information about content requested by the device 100 and information about a communication interface in response to identification information of the device 100.

Then the communication control server 400 transmits information about the content providing device to the device 100 (S211), and the device 100 receiving the information requests content from the content providing device (S213) and receives the requested content from the neighboring device 100n (S215).

The content providing device of the present disclosure one of a plurality of neighboring devices adjacent to the device 100 and refers to a device designated by the communication control server 400 in view of information about a communication interface.

Additionally, if there are two or more content providing devices, the device 100 may request content from such content providing devices and perform a process of merging received fragmentary files of content.

The communication control server 400 of the present disclosure may identify the content providing device through interworking with the device management server 500 that manages a list of devices which participate in the D2D communication.

This will be described with reference to FIG. 7.

Referring to FIG. 7, the device 100 discovers neighboring devices located within a specific range (S301), and creates a neighboring device list that contains identification information about the discovered neighboring devices (S303).

Thereafter, the device 100 transmits a request message to the device management server 500 in order to participate in D2D communication by obtaining a list of one or more other devices storing all or part of desired content, namely, information about a content providing device (S305). The D2D request message of the present disclosure contains a transaction ID (TID) for identifying a transaction, source address information for indicating an address of a message-sending device, and destination address information for indicating an address of a message-receiving device, and may further contain an identifier, name, size, etc. of desired content.

The destination address information of the present disclosure refers to an address of a message-receiving device, i.e., an address of the device management server 500. The device 100 may obtain information about the device management server 500 by accessing a designated service for D2D communication, and transmit the request message to the device management server 500 by using the obtained information. At this time, the device 100 may transmit the request message to the device management server 500 through a UDP tracker protocol (UDPT).

The communication control server 400 monitors and detects the request message transmitted by the device 100 (S307). At this time, the communication control server 400 may forward the message, transmitted through the communication network 300, to itself by shinkhole routing, or copy and detect the message in a mirroring manner.

The communication control server 400 monitors and detects the request message transmitted by the device 100 in order to provide information about a content providing device to the device 100. If this process is not performed, the device 100 may merely receive, from the device management server 500, information about a device having the same content as requested, and may not receive information about a content providing device selected from among neighboring devices.

For this, the communication control server 400 of the present disclosure monitors, detects and collects the request message delivered to the device management server 500 by the device 100 (S307), and then changes a transaction ID contained in the request message (S309). The changed transaction ID in the present disclosure only needs to be different from the transaction ID contained in the request message and does not need to be set to a specific transaction ID. Thereafter, the communication control server 400 transmits the request message with the changed transaction ID to the device management server 500 and requests a device list (S311).

The device management server 500 transmits the device list to the device 100 in response to the request received at step S305 (S313). At this time, the device list contains the transaction ID changed by the communication control server 400. Also, the device management server 500 registers the device 100 as a device which participates in D2D communication (S317).

On the other hand, the device 100 that receives the device list from the device management server 500 at the step S313 compares the transaction ID contained in the transmitted request message. Then, since the comparison result indicates disagreement, the device 100 ignores the device list received through the step S313 (S315).

In this process, the communication control server 400 changes the source address information contained in the request message collected at the step S307 to its own IP (S319).

Then, the communication control server 400 may transmit a device list request message with the changed source address information to the device management server 500 and receive a device list (S321~S323). Since the source address information contained in the device list request message received from the communication control server 400 is changed to the communication control server 400, the device management server 500 may transmit the device list to the communication control server 400.

At this time, the communication control server 400 may provide the device management server 500 with the neighboring device list received from the device 100 and information about content requested by the device 100, and then may receive the device list containing only information about a device having the content among neighboring devices contained in the neighboring device list.

In addition, the communication control server 400 may provide the device management server 500 with information about content requested by the device 100, and then may receive the device list containing information about a device having the content.

Also, the device management server 500 may register the communication control server 400 as one device that participates in D2D communication (S325).

Thereafter, the communication control server 400 may extract the final content providing device by changing the priority of a device according to information about a communication interface in the received device list or deleting or adding a specific device (S327). At this time, the communication control server 400 may arrange devices in the order of priorities according to the information about the communication interface and then create a list of the content providing devices.

Then, the communication control server 400 transmits information about the content providing devices to the device 100 (S329). Therefore, the device 100 may request and receive content from the corresponding content providing devices according to the information about the content providing devices (S331~S333).

At this time, the device 100 may receive in parallel one or more fragmentary files of the requested content from one or more content providing devices and, by merging the received fragmentary files, complete a content file desired to be received.

Additionally, at the step S305, the device 100 may further transmit a content possession list which is a list of contents possessed by the device 100. The device management server 500 that receives the content possession list may store the content possession list together with information about content requested by the device 100 at the step 317 of registering information about the device 100 and thereby manage information about devices which participate in D2D communication.

Hereinbefore, the D2D content providing method according to embodiments of the present disclosure is described.

The above-discussed D2D content providing method of the present disclosure may be provided in the form of a computer-readable medium suitable for storing computer program instructions and data. The D2D content providing method according to one or more embodiments of the present disclosure may be performed by the device, including steps of creating a neighboring device list by discovering at least one connectible neighboring device, transmitting a D2D communication request for content to a communication control server, the request including the neighboring device list and information about an available communication interface, receiving, from the communication control server, information about one or more content providing devices selected from among neighboring devices contained in the neighboring device list, based on the information about the communication interface, and requesting and receiving content from the content providing device.

In this case, a program recorded on the recording medium may perform the above-described functions by being read, installed and executed in the computer.

In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

This computer-readable medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit.

Further, the computer-readable recording medium may be distributed over networked computer systems so that computer-readable code can be stored and executed in a distributed fashion. In addition, functional programs and their associated code and code segments for implementing the present disclosure may be easily deduced or altered by programmers of the technical field of the present disclosure in consideration of the system environment of a computer that reads a recording medium and executes the program.

While the present disclosure contains many specific implementation details, these should not be construed as limitations on the scope of the disclosure or of what may be claimed, but rather as descriptions of features that may be specific to particular embodiments of particular disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

What is claimed is:

1. A device-to-device (D2D) content providing method at a device, the method comprising:
    creating, at the device, a neighboring device list by discovering one or more neighboring devices connectible to the device, wherein the device includes a first interface for supporting D2D communication and a second interface for supporting access to a communication network, and wherein the second interface includes at least one communication module;
    transmitting, at the device, to a communication control server, a D2D communication request including the neighboring device list, information about a type of the at least one communication module of the second interface of the device, and information about a specific content, wherein the D2D communication request is electrical signals to request the communication control server to select at least one content-providing device from among the one or more neighboring devices indicated in the neighboring device list;
    receiving, at the device, from the communication control server, information about the selected at least one content-providing device, wherein from among the one or more neighboring devices indicated in the neighboring device list, the communication control server selects the at least one content-providing device having a same content as the specific content requested by the device, based on the information about the specific content, and further having a same type of at least one communication module as the type of the at least one communication module of the second interface of the device, based on the information about the type of the at least one communication module of the second interface of the device;

requesting, at the device, the selected at least one content-providing device to provide the specific content; and receiving, at the device, the specific content from the selected at least one content-providing device, wherein the method includes, when the one or more neighboring devices to be connectible to the device are not discovered in the neighboring device list of the one or more neighboring devices:

transmitting the D2D communication request including only the information about an available type of at least one communication interface module of each of the one or more neighboring devices to the communication control server;

receiving, from the communication control server, the information about at least one available device to provide the specific content selected based on the information about the type of at least one communication interface module;

requesting the at least one available device for providing the specific content in response to the information about the at least one available device; and receiving the specific content from the at least one available device.

2. The method of claim 1, wherein said creating the neighboring dev ice list of the one or more neighboring devices includes:

obtaining identification information about at least one other device through a D2D discovery message transmitted and received within a specific range, obtaining the identification information about the at least one other device by emitting the D2D discovery message within the specific range and then receiving a corresponding response message, or obtaining the identification information about the at least one other device through interworking with a digital unit (DU) connected with one or more radio units (RUs) located in an access network accessed by the device, and creating the neighboring device list of one or more neighboring devices by defining the obtained identification information about the other device as a neighboring device.

3. The method of claim 1, wherein said creating the neighboring dev ice list of one or more neighboring devices comprises:

discovering connectible one or more other devices;

calculating a content transmission quality factor between the discovered one or more other devices; and selecting other device, among the discovered one or more other devices, having the calculated content transmission quality factor greater than a given value, and then creating the ne ighboring device list of one or more neighboring devices by defining the selected other device, among the discovered one or more other devices, as the neighboring device.

4. The method of claim 1, wherein the information about the type of the at least one communication interface module includes communication interface information about at least one of Wi-Fi, Bluetooth, LTE (Long Term Evolution), and 3G communication which are available at the device.

5. The method of claim 1, further comprising:

when the at least one available device exists two or more available devices, merging contents each received from the two or more available devices.

6. The method of claim 1, wherein the transmitting further comprises:

transmitting a content possession list, which is a list of one or more contents possessed by the device, to the communication control server.

7. A device-to-device (D2D) content providing method at a communication control server communicating with a device including a first interface for supporting D2D communication and a second interface for supporting access to a communication network, the second interface including at least one communication module, the method comprising:

receiving, from the device, a D2D communication request including a neighboring device list, information about a type of the at least one communication module of the second interface of the device, and information about a specific content, wherein the device creates the neighboring device list by discovering one or more neighboring devices connectible to the device, and wherein the D2D communication request is electrical signals to request the communication control server to select at least one content-providing device from among the one or more neighboring devices indicated in the neighboring device list;

selecting, from among the one or more neighboring devices indicated in the neighboring device list, the at least one content-providing device having a same content as the specific content requested by the device, based on the information about the specific content, and further having a same type of at least one communication module as the type of the at least one communication interface module of the second interface of the device, based on the information about the type of the at least one communication module of the second interface of the device; and transmitting, to the device, information about the selected at least one content-providing device, wherein said D2D content providing method comprising, when the one or more neighboring devices to be connectible to the device are not discovered in the neighboring device list of the one or more neighboring devices:

receiving, from the device, the D2D communication request including only the information about an available type of the at least one communication interface module of each of the one or more neighboring devices;

selecting, among the one or more neighboring devices, the at least one content-pro viding device having the available type of the at least one communication interface module; and transmitting, to the device, the information about the at least one available device to provide the specific content selected based on the information about the available type of the at least one communication interface module.

* * * * *